Dec. 4, 1934.   F. L. SCOTT   1,983,315
MOUNTING FOR REAMER CUTTERS
Filed Oct. 27, 1931
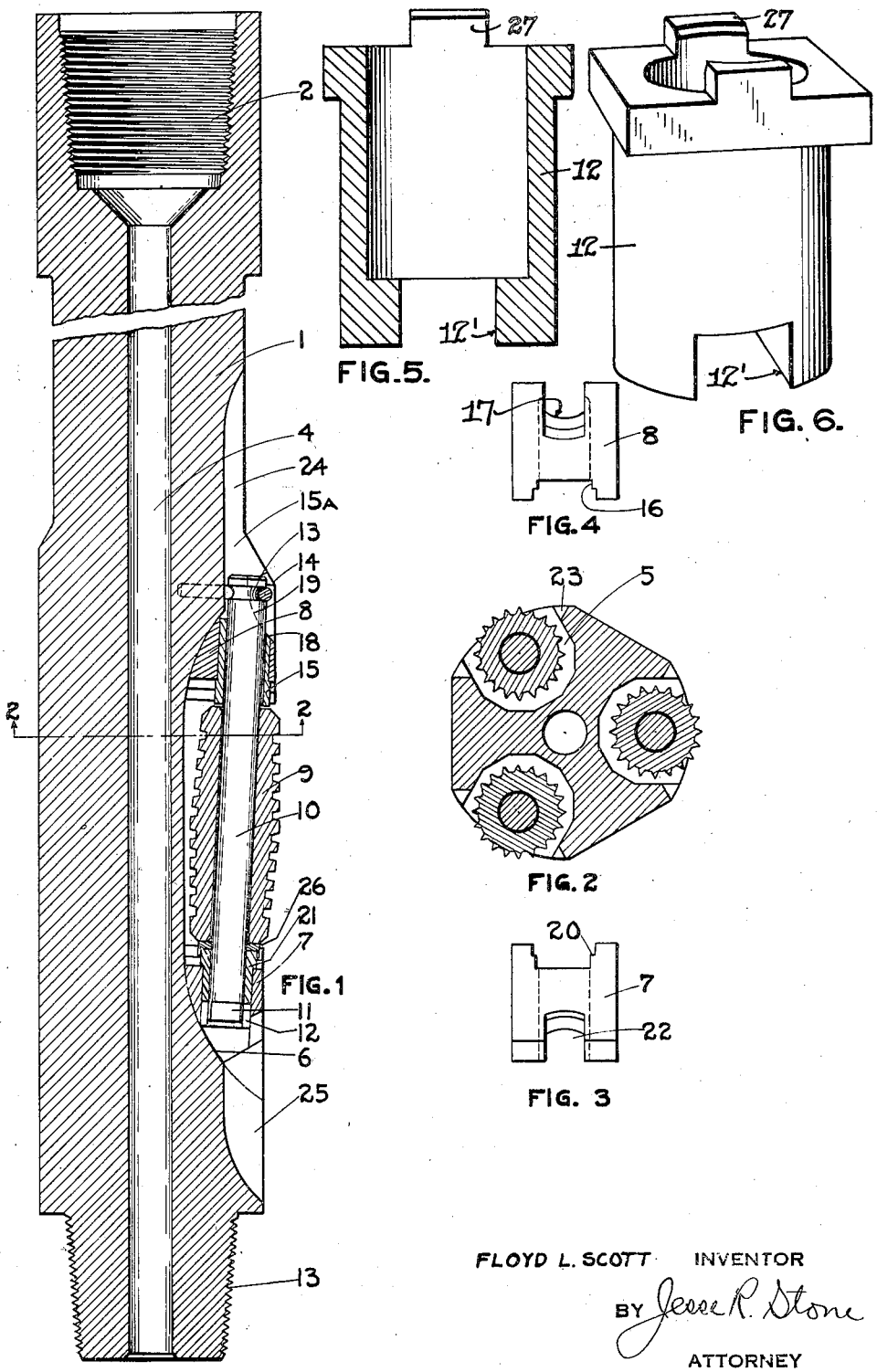
FLOYD L. SCOTT INVENTOR
BY Jesse R. Stone
ATTORNEY Patented Dec. 4, 1934

1,983,315

UNITED STATES PATENT OFFICE 1,983,315

MOUNTING FOR REAMER CUTTERS

Floyd L. Scott, Houston, Tex., assignor to Hughes Tool Company, Houston, Tex., a corporation of Texas Application October 27, 1931, Serial No. 571,323

7 Claims. (Cl. 255—73)

My invention relates to reamers for use in deep well operations to preserve the gauge of the well bore. It pertains particularly to reamers of this character having roller cutters thereon.

It is an object of the invention to provide a mounting for the cutters upon the head of the reamer which may be easily and economically manufactured and assembled.

I desire to support the ends of the pin upon which the rolling cutter is mounted in blocks which may be easily formed and shaped to fit accurately within recesses formed in the side of the head by milling cutters of ordinary construction.

The invention also includes the particular shape of the supporting blocks and the manner in which the cutter pins are supported therein.

In the drawing herewith Fig. 1 is a central vertical section through a reamer head having cutters mounted thereon in accordance with my invention.

Fig. 2 is a transverse section on the plane 2—2 of Fig. 1.

Fig. 3 is a front elevation of the supporting block for the lower end of the pin.

Fig. 4 is a similar front elevation of the supporting block for the upper end of the pin.

Fig. 5 is a longitudinal section through one of the bushings employed, shown somewhat enlarged.

Fig. 6 is a perspective view of said bushing.

The head 1 upon which the cutters are mounted is an elongated casting or block of steel which as shown in Fig. 2 may be flattened on three sides to provide space for the passing of the flushing fluid. The upper end of the reamer head is formed with a threaded socket 2 for engagement with the tool joint or drill stem above. The lower end is formed into a threaded shank 3 to engage with the joint below the reamer. A central longitudinal channel 4 is formed in the head to provide for the passage of flushing fluid.

As will be noted from Fig. 2, I have provided for mounting three separate rolling cutters on the sides of the head, it being understood, of course, that a larger or smaller number of cutters may be used. Each cutter is mounted within a recess 5 in the side of the head. This recess is formed by the use of a toothed milling cutter the cutting periphery of which is of the proper shape and contour to cut an opening in the side of the head of the desired size. It is also of the proper diameter to shape the ends of the recess 5 on an arc indicated at 6 in Fig. 1 which will inter-fit with the blocks 7 and 8 which act to support the ends of the cutter pin. Between these ends of the recess the longitudinal bottom or trough of the recess is a straight surface parallel with the axis of the head.

The reamer cutter 9 is an elongated cutter toothed on its outer periphery and mounted to rotate on a shaft 10 which is supported at its ends in the blocks 7 and 8 previously mentioned. The lower end of the pin 10 is flattened as shown at 11 to engage within the bushing 12 which supports the lower end of the pin the bushing being slotted at 12' to receive the flattened end of said pin. The upper end of the pin projects beyond the upper block and is formed with a circumferential groove 13 to receive a staple 14 which may be driven into diverging recesses in the head.

The upper block 8 is cut from a disc of material, the outer periphery of which is curved on the same radius and conforms to the shape of the milling cutter employed in milling the recesses 5 in which the supporting blocks are received. The block has a longitudinal opening therethrough to receive a bushing 15 which receives the upper end of the cutter pin 10. The lower end of the block is formed with shoulders at 16 which are adapted to engage with similar shoulders on the lower end of the bushing 15 and thus prevent rotation of the bushing. The upper end of the block is cut with a slot or groove 17 through which access may be had to the upper end of the cutter pin. The bushing is beveled off at 18 as shown in Fig. 1 to allow a tool to be inserted downwardly within a slot 19 in the head of the cutter pin 10 and by the staple 14 so that the staple may be wedged outwardly from its connection in the head of the reamer.

The lower block 7 has a somewhat similar shape. The upper end is shouldered at 20 to inter-fit with the upper end 21 of the bushing and prevent rotation thereof and the lower end is slotted or cut away at 22 to permit a punch to be inserted to engage the lower end of the cutter pin to drive it from its position when desired.

Both of these blocks are set in position as shown in Fig. 1 and the ends of the blocks are welded in position on opposite sides as indicated at 23 in Fig. 2, a space being allowed on each side of the recess to receive a joint of welding material at each side of the blocks.

Above the pin the side of the head is recessed at 24 to provide a groove to allow the insertion of the cutter pin 10 which as will be noted from Fig. 1 is inclined inwardly toward the lower end. Below the reamer cutter the head is recessed at 25 to allow the insertion of a punch to drive the pin from its position. Washers 26 may be employed between the lower end of the cutter and the bushing, said washers being shaped to fit against the outer shoulder 20 in the lower block and thereby be held against rotation. There is a diametrical slot also on the washer to interfit with upwardly projecting lugs 27 on the bushing 26, thus preventing relative rotation.

The manner in which the cutter is set in position will be understood from the description already given. The blocks 7 and 8 are fixed in position in the head by welding as described and this may be done after the bushings have been fitted in position and the cutter pin 10 inserted therethrough as shown in Fig. 1. The upper bushing will be moved into position in the block from the lower side thereof and the bushing 12 on the lower end of the pin will be inserted from above the block 7. The washer 26 will then be fitted on to the upper end of the bushing.

When the cutter has been properly fixed in position it may be removed by forcing a tool into the upper end of the recess 19 in the cutter pin by the staple 14 removing the staple. A punch may be used to drive the pin 10 upwardly so as to release the cutter and the bushing. New cutters and new bushings if desired may be inserted whenever the parts become worn.

The advantage of this construction is that it is cheaply and accurately made and enables the operator to change the cutters when desired with little difficulty.

What I claim as new is:

1. In a well reamer, a head having cutter-receiving recesses in the sides thereof, upper and lower blocks fixed in position in said recesses, bushings inserted into openings in said blocks, means to prevent rotation of said bushings, cutter pins in said bushings removable upwardly therefrom, cutters on said pins and means engaging said pin and head above said bushings to lock said cutter pins removably in position.

2. In a well reamer, a head having cutter receiving recesses in the sides thereof, upper and lower blocks formed to fit accurately in said recesses and welded in place therein, a cutter pin, a rotatable cutter thereon, bushings on said pin at the ends of said cutter and fitting into openings in said blocks, and means above said blocks to secure said pins in said bushings.

3. In a well reamer, a head having cutter receiving recesses in the sides thereof, upper and lower blocks formed to fit accurately in said recesses and welded in place therein, a cutter pin, a rotatable cutter thereon, bushings on said pin at the ends of said cutter fitted into openings in said blocks, shoulders on said bushings, shoulders on said blocks engageable therewith to prevent rotation of said bushings, and means above said blocks to secure said pins in said bushings.

4. In a well reamer, a head having cutter receiving recesses in the sides thereof, upper and lower blocks formed to fit accurately in said recesses and welded in place therein, a cutter pin, a rotatable cutter thereon, bushings on said pin at the ends of said cutter slidable into openings in said blocks, interengageable means on said bushings and said blocks to prevent rotation of said bushings, and means above said blocks to secure said pins in said bushings.

5. A reamer head having cutter-receiving recesses in the sides thereof, said recesses being shaped with the ends thereof curved on the arc of a circle whereby it may be formed by cutting with a circular rotating milling cutter, blocks in the ends of said recesses formed of the contour of a section of the said milling cutter to fit said recesses, said blocks being formed with downwardly and inwardly inclined openings axially aligned, a cutter pin in each recess projecting through said openings, a cutter on each of said pins, said head being channelled above and below said recesses to permit access to said pins, and means to secure said pin detachably in position.

6. A reamer for wells including a head having cutter-receiving recesses in the outer periphery thereof, a cylindrical cutter pin extending longitudinally of each recess, supports for the upper and lower ends of said pin, pin-receiving bushings in said supports, means to prevent rotation of said bushings in said supports, means to prevent rotation of said pin in the lower of said bushings, and a cutter mounted to rotate upon said pin.

7. A reamer for wells including a head having cutter-receiving recesses in the outer periphery thereof, a cylindrical cutter pin extending longitudinally of each recess, supports for the upper and lower ends of said pin, pin-receiving bushings in said supports, heads on the inner ends of said bushings having projections engaging said supports to prevent relative rotation of said bushings, one of said bushings interengaging with said pin to prevent rotation of said pin and a cutter rotatable between said bushings on said pin.

FLOYD L. SCOTT.